Jan. 10, 1950  F. J. WRIGHT  2,494,324
ROAD GRADER
Filed April 29, 1944  3 Sheets-Sheet 1
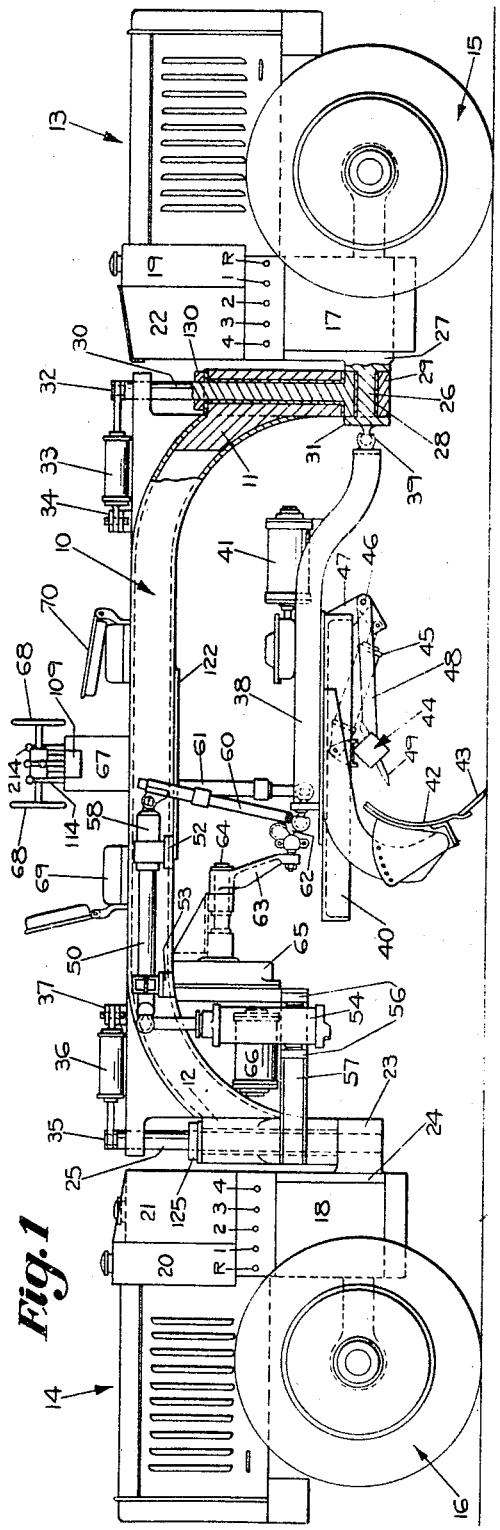
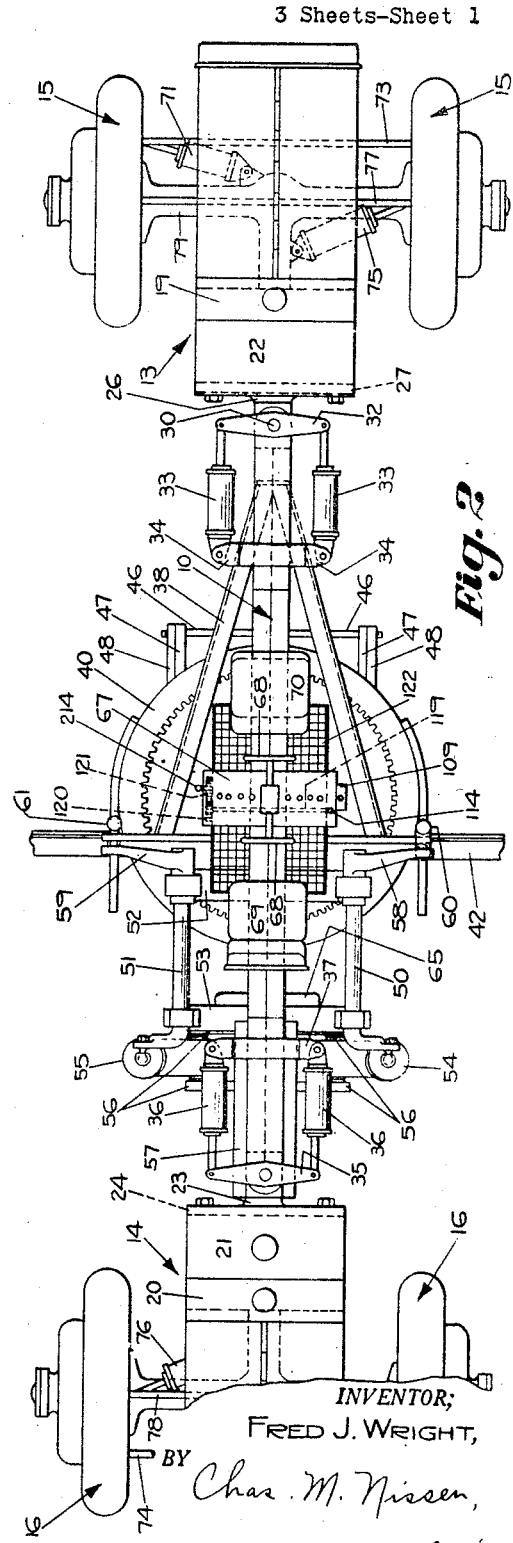
INVENTOR:
FRED J. WRIGHT,
BY Chas. M. Nissen,
ATT'Y.

Jan. 10, 1950

F. J. WRIGHT 2,494,324

ROAD GRADER

Filed April 29, 1944

INVENTOR:
FRED J. WRIGHT,
BY Chas. M. Nissen,
ATT'Y.

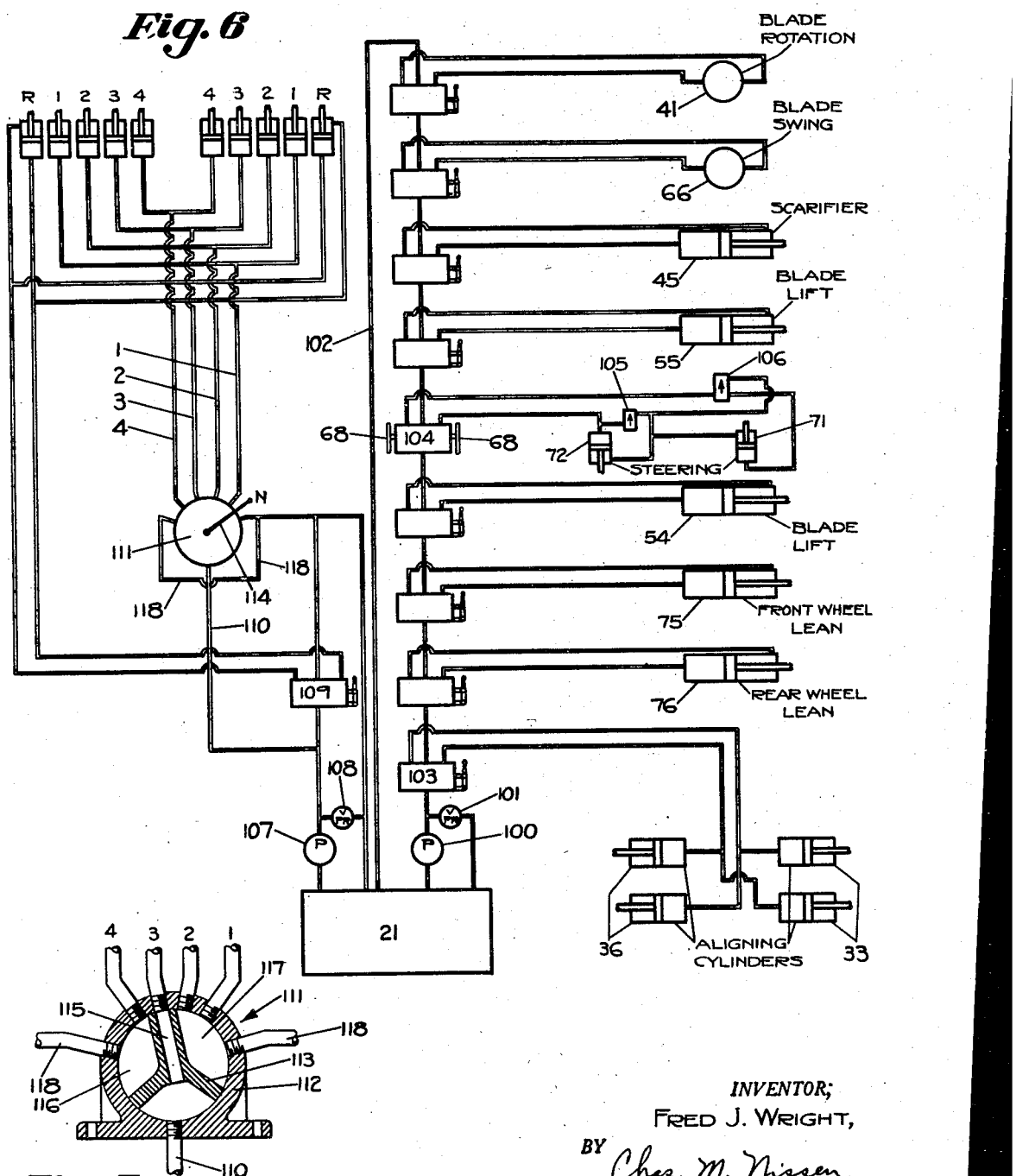

Patented Jan. 10, 1950

2,494,324

UNITED STATES PATENT OFFICE 2,494,324

ROAD GRADER

Fred J. Wright, Upper Arlington, Ohio, assignor to The Galion Iron Works & Manufacturing Company, a corporation of Ohio Application April 29, 1944, Serial No. 533,291

8 Claims. (Cl. 37—156)

This invention relates to a road grader or similar vehicle.

An object of the invention is to provide a road grader in which there are separate tractors or power traction units at the opposite ends thereof which are interconnected by the grader frame and which include the road grading devices generally found on such a unit.

A further object of the invention is to provide a road grader of the general type above mentioned which, preferably, has a single set of control mechanisms which can be operated by an operator on either side thereof.

Another object of the invention is to provide a road grader of the above mentioned type in which one or both of the power traction units are pivotally connected to the main frame for adjustment about vertical axes and in which one of the power traction units is held against movement relative to the main frame with respect to a horizontal axis, while the other unit is mounted for pivotal movement relative to said main frame on a horizontal axis, thus providing a three-point suspension for the grader frame.

A further object of the invention is to provide a road grader of the above mentioned type in which all four of the wheels are both traction and steering wheels and preferably in which all four of the wheels may be adjustably leaned about horizontal axes.

Another object of the invention is to provide a road grader having a pair of spaced power traction units each provided with speed change gearing including reversing gearing and a control system therefor, preferably of the hydraulic type, for simultaneously controlling the speed change gearing of the two power traction units.

Other objects of the invention will appear hereinafter, the novel features and combinations being set forth in the appended claims.

In the accompanying drawings,

Fig. 1 is a side elevational view of a road grader incorporating the features of my invention;

Fig. 2 is a plan view of the grader of Fig. 1;

Figure 3:
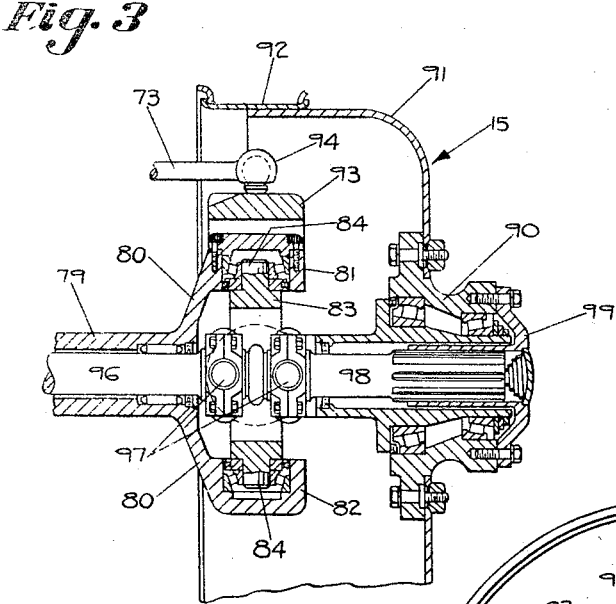
Fig. 3 is a sectional plan view showing one of the wheels of the grader with the tire removed, the bottom portion being broken away.
Figure 4A:
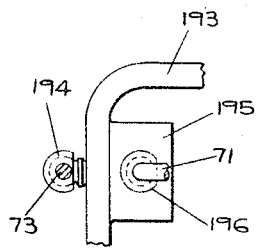
Fig. 4 is a sectional elevational view of the wheel, taken on the line 4—4 of Fig. 5, looking in the direction of the arrows.
Figure 4:
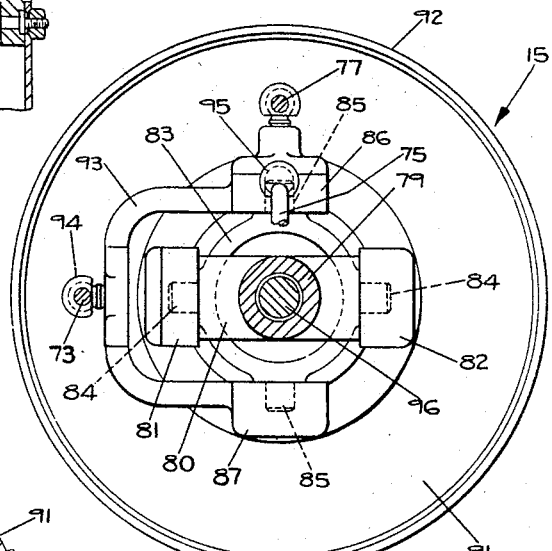
Figure 5:
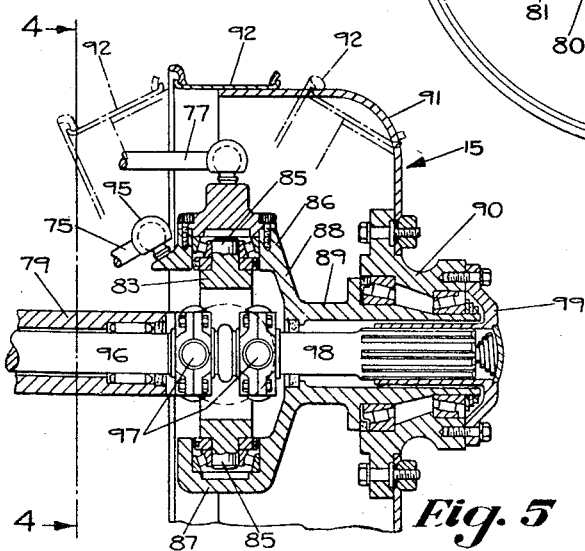

Fig. 4ª is a partial view showing the structure of a bracket on a companion wheel to that of Fig. 4;

Fig. 5 is a sectional elevational view of the wheel of Figs. 3 and 4;

Fig. 6 is a schematic piping diagram of the hydraulic system of the road grader; and Fig. 7 is a sectional elevational view of the control valve for operating the speed change gearing.

Referring first to Figs. 1 and 2 of the drawings it will be seen that the road grader of my invention includes a narrow longitudinally extending main frame 10 which is fabricated by welding together the contacting top and bottom flanges of a pair of channels, the forward ends of which are bent downwardly and receive a forward casting 11 and a similar rearward casting 12, said castings 11 and 12 being rigidly attached to the channel members of said main frame 10.

While either end of the grader might be considered the front end, for convenience the right-hand end as viewed in Figs. 1 and 2 shall be so considered. Adjacent said front end is a tractor, traction unit or power traction unit 13, and a generally similar power traction unit 14 is provided adjacent the rear end of the grader. These two power units 13 and 14 are of similar construction except for certain differences in connecting or attaching them to the main frame 10, which is hereinafter pointed out. In any claim where the expression tractor, traction unit, or power traction unit is employed, it is to be understood as defining a unit similar to unit 13 or 14 and including a motor, traction wheels, or the equivalent, and drive gearing between them, all assembled as a unitary body.

Each power traction unit 13, 14, includes a motor of the internal combustion type, such as a gasoline or Diesel engine, which drives a pair of wheels, the wheels for the unit 13 being seen at 15, 15 and the wheels for the unit 14 being seen at 16, 16. The expression "wheels" is used to include the pneumatic tires which form a part thereof. The construction of one of the wheels and associated parts is described more completely hereinafter.

Each power traction unit 13 or 14 drives its own associated wheels 15 or 16, as the case may be, through a variable speed gear transmission 17 or 18. From the gear transmission 17 there is a forwardly extending drive shaft which drives laterally extending axles through the customary differential which may be in operation or may be locked out, as desired, to drive the two associated wheels 15. Similar drive gearing is provided between the gear transmission 18 and the wheels 16.

The gear transmissions 17 and 18 are of identical design and each includes reversing gear mechanism and four planetary speed changing gear mechanisms, all of which are operable by hydraulic motors as hereinafter explained.

It is thus manifest that the grader includes a power traction unit at each end so there is a maximum concentration of weight and also a substantially equal distribution of weight on the front and rear wheels 15, 15 and 16, 16. This has a number of important advantages. In the first place, there is a short gear train for each motor to the driving or traction wheels adjacent it. In the second place, under all operating conditions of the road grading mechanism there will be substantial weight on both the front and rear traction wheels and it is a well known fact that the available tractive effort is a direct function of the weight on the wheels.

Furthermore, by employing two separate power traction units the total H. P. of the entire grader may be substantially increased over that possible by employing a single motor without involving the necessary use of a very large H. P. motor. Purely by way of illustration, if a 120 H. P. grader is desired, it may be produced by using two 60 H. P. engines, one in each of the power transaction units 13 and 14. This has considerable advantage of low cost since engines of such H. P. are produced in considerably greater quantity than engines of twice this H. P.

The power traction units 13 and 14 are provided with separate gas tanks 19 and 20, respectively, and unit 14 is provided with an oil tank 21 for the hydraulic system, while unit 13 is provided with a tool box 22.

In the preferred embodiment of my invention the rear traction unit 14 is pivotally connected to the rear end of the main frame 10 by means of a forwardly extending boss 23 which is integral with a plate 24 removably attached to the housing of the gear transmission 18. Extending upwardly from the boss 23 and welded or otherwise rigidly attached thereto is an upright shaft 25 which is received in a journal bearing in the casting 12. The bottom portion of the casting 12 rests on top of the boss 23. The upper portion of the shaft 25 is of reduced diameter and threaded thereon is a large nut 125 resting on top of a disc bearing, thus preventing up and down sliding movement of the casting 12 with respect to the shaft 25. Thus a pivotal connection is provided about an upright axis between the power traction unit 14 and the main frame 10. The power traction unit 14 is otherwise rigidly connected to the main frame 10 and particularly it is held against any movement relatively thereto on a horizontal axis.

The power traction unit 13 is also provided with a rearwardly extending boss 26 which is carried on a removable plate 27 attached to the gear transmission box 17. The boss 26 is cylindrical in shape and is provided with a journal bearing 28 upon which a split hub 29 is journaled, which split hub 29 is rigidly attached to and preferably formed as an integral part of an upstanding shaft 30 which is journaled in the casting 11. The upper portion of shaft 30 is of reduced diameter and threaded thereon is a large nut 130 resting on top of a disc bearing, thus preventing up and down sliding movement of the casting 11 with respect to the shaft 30.

It is thus obvious that the cylindrical boss 26 provides a pivotal connection about a horizontal axis between the power traction unit 13 and the main frame 10, while the upstanding shaft 30 provides a pivotal connection between the two about an upright axis. The boss 26 is provided with an integral head 31 which holds the split hub 29 in place. It is evident that the pivotal connection between the power traction unit 13 and the main frame 10 about the horizontal axis of boss 26 coupled with the fact that the power traction unit 14 is rigidly connected to the main frame insofar as any horizontal axis is concerned, provides a three-point suspension of the main frame 10 with reference to the two power traction units 13 and 14. This, of course, provides for free tilting of the power traction unit 13 with respect to the main frame 10 so that there is no twisting or distortion of the main frame 10 as the grader travels over uneven ground.

In the preferred embodiment of my invention, the upright pivotal connections provided by the shafts 25 and 30 are included, though in certain broader aspects of the invention they may be omitted. These pivotal connections, of course, provide for the lateral swinging of either or both of the power traction units 13 and 14 with respect to the grader frame 10. This permits one of the units, for example, unit 14, to be traveling in a ditch, while the other unit is traveling on the surface of the road, with the main frame 10 taking a diagonal position with respect to the longitudinal axes of both of the said power traction units 13 and 14.

To provide for this swinging adjustment of the power traction unit 13, the upper end of the shaft 30 carries a rigidly connected cross arm 32, to the outer free ends of which are pivotally connected the piston rods of a pair of hydraulic motors or jacks 33 of the single acting type, the rear ends of which are pivotally connected to laterally extending arms 34 attached to the main frame 10. Similarly, the upper end of the rear shaft 25 carries a cross arm 35, the free ends of which are connected to the pistons of single acting piston motors or jacks 36, the rear ends of which are pivotally connected to laterally extending arms 37 carried by said main frame 10.

Extending rearwardly from the front end of the main frame 10 is a drawbar 38, the front end of which is pivotally connected by a universal ball and socket joint 39 to the boss 26. The drawbar 38 carries the usual circle 40 which is preferably adjustable through 360° by a rotary hydraulic motor 41 mounted on the drawbar 38. The circle 40 carries a moldboard 42 provided with a blade 43 which is the usual earth working or road grading device carried by a road grader.

In general, the structure of the drawbar, circle, moldboard and blade as well as its operating mechanism, preferably follows the disclosure of similar apparatus in the patent to F. E. Arndt, No. 2,340,169 for a Road grader, dated January 25, 1944, and unless a contrary fact is indicated, it is to be understood that the road grading apparatus as well as all the mechanism for adjusting it follows in general that disclosed in said Arndt patent.

The present road grading device differs from the Arndt patent in that there is a scarifier 44 which is carried by the circle 40 so as to rotate with the moldboard 42 and blade 43. The scarifier 44 is adjustable into and out of operative position by a double acting hydraulic piston motor 45, the rear end of which is pivoted to the circle by an appropriate bracket and the piston rod of which is pivoted to an operating lever which is rigidly attached to a cross shaft 46 (see Fig. 2), the outer ends of which are mounted freely in supporting brackets 47 which are supported by the circle 40. A pair of arms 48 rigidly attached to the extreme outer ends of the shaft 46 extend downwardly or rearwardly, as the case may be, to the main transverse block of the scarifier which carries the usual removable teeth 49.

The circle 40, the rear end of the drawbar 38 and the moldboard 42 and blade 43 can be raised and lowered, shifted laterally, and adjusted angularly with respect to a horizontal plane through a wide range of adjustments, including adjustment of the blade to substantially vertical or upright bank sloping positions on opposite sides of the vehicle and to any intermediate angular position between these two extremes, including, of course, the horizontal position.

Briefly described, this mechanism for raising, lowering and angularly adjusting the blade 43 consists of a pair of longitudinally extending rods or shafts 50 and 51 on opposite sides of the main frame 10 each supported between front and rear bearings carried on laterally extending front and rear frame members 52 and 53. The shafts 50 and 51 have integral laterally extending crank arms to which the piston rods of a pair of laterally spaced upwardly extending pivotally mounted double acting piston type hydraulic motors or jacks 54 and 55 are attached. The lower ends of the hydraulic motors 54 and 55 are pivotally connected to laterally extending arms 56 of a platform 57 which is rigidly attached to and forms a part of the main frame 10.

The forward ends of the two rods 50 and 51 carry crank arms 58 and 59, respectively, to which are pivotally connected extensible crank rods 60 and 61, the lower ends of which are pivotally connected by ball and socket joints to the opposite ends of a crossbar of the drawbar 38 in a manner well understood in this art and disclosed completely in the above-identified Arndt Patent No. 2,340,169.

A lateral shift link 62 pivotally connected at one end to a cross-arm of the drawbar 38 and at the other end by the ball and socket joint to a crank arm 63, provides for lateral shifting of the blade and is a part of the mechanism for adjusting the angle of slope of said blade to the horizontal.

The crank arm 63 is carried on a longitudinally extending shaft 64 which is centrally located laterally of the machine or, in other words, is directly below the main frame 10. This shaft 64 is driven by a worm and worm gear reduction mechanism within a housing 65 from a rotary hydraulic motor 66 mounted on the platform 57.

Adjacent the central portion of the main frame 10 and extending upwardly therefrom is an upright post or housing 67 which supports and houses a plurality of individually operable banked four-way hydraulic valves which are illustrated individually in Fig. 6 of the drawings. These hydraulic valves are provided with individual operating levers to control various hydraulic motors as hereinafter described more completely. One of said valves is controlled by a pair of steering wheels 68, one of which extends forwardly and the other rearwardly so that they may be operated selectively by an operator stationed on a rear seat 69 or a forward seat 70, both seats preferably being of the folding type so that when one is in use, the other may be folded down to increase the visibility of the operator. An operator's platform 122 is preferably provided on the main frame 10 at the operator's station adjacent said seat 69 or 70. The platform 122 is preferably of grill work so the operator can see through it and see the work ahead of the moldboard 42.

It may be pointed out that regardless of which direction of travel the vehicle is going, the operator on the seat 69 or 70 will operate the steering wheel 68 in a conventional manner.

To provide for steering of the vehicle, it is preferred to steer both pair of front and rear wheels simultaneously, particularly in view of the fact that this provides for a minimum turning radius of the road grader. In certain broader aspects of the invention, however, only one pair of wheels 15 or 16 need be steered. Steering of the wheels is provided by front and rear double acting hydraulic piston motors 71 and 72 (see Figs. 2 and 6), the cylinders of which are pivotally connected to the axle housings of the power traction units 13 and 14, respectively, and the pistons of which are pivotally connected by ball and socket universal connections to the wheel assemblies as hereinafter explained more completely. The front and rear wheels are connected by cross-rods 73 and 74 to provide for their swinging in unison.

I also preferably provide means for adjustably leaning the two wheel assemblies 15, 15 together about spaced horizontal axes and also for leaning the two wheel assemblies 16, 16 about spaced horizontal axes, though within the scope of my invention in some of its broader aspects, the leaning of the wheels may be confined to one of the power traction units 13 or 14 or eliminated entirely. The leaning of the wheels is controlled by double acting hydraulic piston motors 75 and 76, the cylinders of which are pivotally attached to the drive shaft housings of the power traction units 13 and 14, and the pistons of which are pivotally attached by ball and socket universal connections to wheel brackets as hereinafter pointed out.

To provide for the simultaneous and similar adjustment of the wheels 15, 15 about their spaced horizontal axes, they are interconnected by a cross-rod 77. A similar connecting cross-rod 78 is provided for the rear wheels 16, 16.

Attention is now directed particularly to Figs. 3, 4 and 5 which illustrate in some detail the structure of the right-hand wheel or wheel assembly 15, and it is to be understood that the other wheels 15 and 16 are of similar construction except for such differences as are pointed out. It is, of course, obvious that in order to drive wheel 15 and at the same time provide both for its steering and variable leaning, it is necessary to have extreme flexibility so that the driving relation may be maintained while the wheel is adjusted about both upright, or substantially vertical, and horizontal axes. In other words, the wheel 15 is mounted universally with respect to an axle housing 79 of the power traction unit 13.

To provide this structure, the outer end of the axle housing 79 is forked at 80 in a horizontal plane to provide spaced bearing cups 81 and 82 carrying anti-friction roller bearings and supporting a universal ring 83 on trunnions 84, the axis of which is horizontal. At right angles to the trunnions 84 the ring 83 carries another pair of trunnions 85 which lie in a substantially vertical or upright axis but which may, if desired, be given a slight amount of camber.

The trunnions 85 are provided with anti-friction roller bearings and are received in upper and lower bearing cups 86 and 87 formed on the top and bottom, respectively, of a forked bracket 88 of a stub axle 89 which carries a hub 90 of the wheel 15 on spaced anti-friction roller bearings. The hub 90 carries a drum 91 which in turn carries a rim 92 upon which the pneumatic tire of the complete wheel assembly 15 is mounted. In Fig. 5 of the drawings the extreme sloping positions of the wheel 15 are shown in dotted lines by illustrating the extreme positions of the rim 92.

From the above description it is obvious that the wheel 15 is universally mounted with respect to the axle housing 79 of the power traction unit 13 by virtue of the fact that it may be adjusted on a horizontal axis provided by trunnions 84 and on a vertical axis provided by trunnions 85.

Integrally connected with the stub axle 89 and more specifically connected to the top and bottom portions of the bracket 88 thereof is a U-shaped bracket 93 (see Fig. 4) which, of course, moves as a unit with the stub axle 89 about the axis of the upright trunnions 85. At its center and in line with the axes of the trunnions 84 the bracket 93 carries a ball and socket joint 94 which is formed on an end of the cross-rod 73. The opposite end of the cross-rod 73 is similarly connected to a ball and socket universal joint also in line with the horizontal trunnions of the other wheel assembly 15 which is illustrated at 194 in Fig. 4ª of the drawings and which is mounted on a bracket 193 similar to the bracket 93 except for one particular. That is, the bracket 193 is provided with an inwardly extending and arcuately formed extension 195 which carries a ball 196 which forms part of the ball and socket joint on the outer end of the piston rod of double acting hydraulic jack 71 which provides for steering of the two wheels 15, 15. Obviously by adjusting the double acting motor 71 the two wheels 15 will swing about the spaced upright axes of the two wheel assemblies 15 provided by the upright trunnions, one pair of which is illustrated at 85, 85 in Figs. 4 and 5 of the drawings.

The leaning of the wheels is, of course, by motor 75, the outer end of the piston rod of which is connected by ball and socket joint 95 (see Figs. 4 and 5) formed on the upper cup 86 of bracket 88. Obviously by adjusting the hydraulic motor 75 the two wheels 15 may be adjustably leaned on laterally spaced horizontal axes one of which is provided by the trunnions 84.

A driving connection to each wheel 15 is provided by a structure illustrated in Figs. 3, 4 and 5 of the drawings. Such structure includes an axle 96 mounted in the housing 79, which at its outer end is provided with a pair of universal joints 97 which in turn are connected to a stub axle 98 splined to a removable cap 99 connected to and forming a part of the hub 90.

It is, of course, to be understood that the detailed description of the apparatus of Figs. 3, 4 and 5 applies to each of the wheels 15 and 16, except that of the two pair of wheels 15, 15 or 16, 16, only one of them will utilize the ball and socket connection 95 for leaning the wheels, while only the other will utilize the ball and socket connection including the ball 196 (Fig. 4ª) for steering the wheels. A similar condition will exist as to the pair of wheels 16, 16.

Attention is now directed particularly to Figs. 6 and 7 of the drawings and to the hydraulic system for controlling various elements of the road grader. In Fig. 6 the various valves are shown as individual valves, although they are preferably banked together as a unit in a manner disclosed in my application, Serial No. 496,634 for a Hydraulic system, filed July 29, 1943, and now abandoned. Furthermore, the structure of the individual four-way valves particularly follows that of my above identified application.

The hydraulic tank 21 provides hydraulic fluid, such as oil, for a pump 100 preferably driven from the motor of the power traction unit 14, and a high pressure relief valve 101 provides a safety by-pass circuit for said pump 100. The output from the pump 100 is delivered successively to individual four-way control valves for the various hydraulic motors and, under normal conditions, with all of the valves in their neutral positions, a no-load by-pass will be provided through all of them to a return pipe 102. All of the four-way valves are of standard construction as illustrated, for example, in my application above identified, and consequently need no detailed description. They are all of the locking type so that they lock their associated motors in place when in neutral positions. Furthermore, they provide for a series connection to any two or more hydraulic motors the four-way or control valves of which are operated simultaneously.

It may be pointed out, however, that the bottommost valve in Fig. 6 of the drawings, designated 103, operates the four alining cylinders 33 and 36. That is, when the valve 103 is actuated in one direction it will positively actuate one hydraulic cylinder or motor 36 on one side of the main frame and one hydraulic cylinder or motor 33 on the other side of the main frame and drain the other pair. Reverse operation of the valve 103 causes operation of the other two hydraulic cylinders or motors 33 or 36, one of which is at the front, the other of which is at the rear while draining the first pair. Thus valve 103 in normal operation will swing both the front and rear power traction units 13 and 14 simultaneously and in equal amounts either in a clockwise direction together or in counter-clockwise direction together. If desired, a pair of double acting hydraulic piston motors may be connected across the lines from valve 103, one for adjusting each power traction unit 13, 14.

The four-way valves for operating the other hydraulic motors are all standard in their construction and in their operation of their associated motors, except that novelty is introduced in the circuit to the steering motors or cylinders 71 and 72. The main branch circuit from the steering valve which is designated 104, to the steering motors 71 and 72, is such that these cylinders are connected in series so that during steering if the front wheels are moved in a clockwise direction as viewed in plan, the rear wheels will be moved in a counter-clockwise direction as viewed in plan and vice versa.

It is known that with such a steering arrangement, if the hydraulic linkage should be subject to leakage, the wheels will not track properly. I have provided mechanism to automatically adjust the wheels to insure their tracking at all times by the simple expedient of maintaining the valve 104 open in either of its reversely operated positions until the pressure relief valve 101 is opened upon both of the steering motors 71 and 72 reaching the ends of their strokes or adjusting their associated wheels 15, 15 and 16, 16 the maximum amount permitted by the mechanical connections to them.

To accomplish this, I employ two high pressure relief valves 105 and 106, high pressure relief valve 105 being connected in parallel with the motor 72, and high pressure relief valve 106 being connected in parallel with the motor 71. These high pressure relief valves 105 and 106 are set to open at a pressure slightly less than that at which pressure relief valve 101 opens. They operate as follows: assuming that valve 104 is operated in either direction, the two motors 71 and 72 will be actuated and if the wheels have become out of alinement and do not track, motor 71 or 72 will reach the end of its stroke first. In the absence of valves 105 and 106 no more movement of either motor 71 or 72 would be possible since they are connected in series. However, assuming that motor 72 has reached the end of its travel, while motor 71 has not, the high pressure relief valve 105 will open and since it is in parallel with motor 72, hydraulic fluid will flow through it and thus shunt motor 72, and flow on to motor 71, actuating it until it reaches the end of its stroke, whereupon high pressure relief valve 101 will open.

A similar action takes place involving high pressure relief valve 106 in case motor 71 reaches the end of its stroke before motor 72 does. It may further be pointed out that a similar system may be employed in connection with the alining motors or cylinders 33 or 36 and this is true where double acting or single acting alining motors are employed. In this connection I contemplate substituting one double acting motor 33 for the two single acting motors 33 and one double acting motor 36 for the two single acting motors 36.

What in effect is substantially an independent hydraulic system is provided for controlling the speed change gearing on the two power traction units 13 and 14. To this end I provide a separate pump 107 preferably driven from the motor of the power traction unit 14, though if desired it may be driven from the motor of power traction unit 13, and preferably this pump uses the oil tank 21, though if desired a separate oil tank may be provided on the power unit 13. A pressure relief valve 108 is provided for the pump 107, and the output of the pump 107 leads to a reversing four-way valve 109 and by way of a pipe or conduit 110, to a rotary speed control valve 111, the internal structure of which is shown in detail in Fig. 7 of the drawings.

The valve 111 includes a casing 112 and a rotor 113 actuated by a handle 114. The rotor 113 is provided with three wings or legs, one of which is provided with a central bore 115. It is obvious that upon swinging the rotor 113, the bore 115 will provide communication selectively with any one of the four pipes numbered 1, 2, 3 and 4, or, when in its neutral position (see Fig. 6), with none of them. Furthermore, the rotor 113 provides drain cavities 116 and 117 which are connected to two branch pipes 118 which return to the tank 21. It is evident that when pressure is applied to any pipe 1, 2, 3 or 4, the other three pipes are draining, and when the handle 114 is in the neutral position, all four pipes 1, 2, 3, 4 are draining. The pipes 1, 2, 3, 4 lead to single acting hydraulic piston motors 1, 2, 3, 4 in parallel, there being one of each number associated with each power traction unit 13 and 14.

These piston motors 1, 2, 3, 4 contact the bands of planetary gears of well known design so that when any pair of motors 1, 2, 3 or 4 is actuated, that particular speed gearing will be operated and the other three will be released. It is thus obvious that by the simple expedient of adjusting the handle 114, both transmission units 17 and 18 may be operated together and the speed of the grader selected at any value.

The direction of travel of the road grader will be determined by the valve 109 which is preferably provided with spring-pressed detents so that it is in either of its extreme positions and never rests in its neutral position. Ths valve controls the two double acting reversing hydraulic motors which are labeled R in Fig. 6 of the drawings. These hydraulic motors are reversely connected, that is, the piston rod head of one is connected to the non-piston rod head of the other so that when one of them operates to drive its tractor unit per se in what might be considered the forward direction, the other will operate to drive its tractor unit per se in what might be considered the rearward direction. That is, looking at the whole grader, obviously one of the power traction units 13, 14 will appear to be going forward while the other appears to be going backward.

It may also be pointed out that in Fig. 1 of the drawings, the positions of the various hydraulic piston motors labeled R, 1, 2, 3 and 4 are illustrated in connection with the two power traction units; the reverse gearing, of course, being the first gearing encountered to the rear of the crank shaft of the driving motor.

Referring to Figs. 1 and 2 of the drawings and comparing them with Fig. 6, it will be noted that there is no operating problem involved in connection with any of the four-way valves which control the adjustment of the various blade actuating motors or the steering or alinement of the main frame by virtue of the possible reversal of the position of the operator. This is not true, however, in connection with the valve 111 and it is, of course, desirable that the operator be able to operate it in substantially the same manner regardless of whether he is sitting on the seat 69 or on the seat 70. For example, the handle 114 is so positioned that an operator on the seat 69 can reach it on the right-hand side of the post 67 and when it is upright it will be in its neutral position. By moving it rearwardly it will successively pass through positions to energize motors 1, 2, 3 and 4 of the two power units 13 and 14.

To provide for similar operation when the operator is on the seat 70, the handle 114 is provided with a transversely extending shaft 119 (see Fig. 2) which is journaled in the post 67. On its opposite end the shaft 119 is provided with a gear 120 which meshes with a gear 121 mounted in housing 67 and provided with a shaft which extends laterally therefrom, to which an upwardly extending handle 214 is connected.

It is obvious that by virtue of the gears 120 and 121, handles 114 and 214 will swing in opposite directions when either is actuated. As a consequence, when the operator is sitting on seat 70, he may actuate the handle 114 from its upright neutral position rearwardly and thus successively energize motors 1, 2, 3, 4 of Fig. 6. In other words, regardless of whether the operator is sitting on seat 69 or 70, he controls the speed change mechanism by grasping a handle which is at the extreme right of post or housing 67, being handle 114 or 214, and moving it rearwardly from the neutral position to change the speed of the vehicle.

It will be noted that in the drawings there is no illustration of mechanism for adjusting the speed of the motors of the two power traction units 13 and 14. This is because they are preferably governor controlled and consequently the speed of the vehicle is controlled by the speed change gearing 17 and 18. If desired, however, a pair of double acting hydraulic piston motors may be connected in series, one for actuating the throttle of the motor of each power traction unit 13, 14, and the two actuated from a manually controlled master cylinder locked in series with said two double acting hydraulic motors. The manually controlled master cylinder may have a lever mounted on the post 67. This, of course, will not be a power actuated hydraulic system but it acts as nothing more than a hydraulic linkage. If desired, a Bowden wire linkage may also be provided to control said two throttles.

In the operation of the device, power will be supplied by the two power traction units 13 and 14 to propel the vehicle or grader in either of reverse directions at any one of four different speeds. The operator may drive the vehicle in reverse directions by the simple expedient of changing his position so as to sit on seat 69 or 70, thus being able to look in the direction of travel for reverse movement. The operator will have the grader blade under his control at all times so that he can raise it, lower it, or angularly adjust it through a wide range of adjustments to either side of the vehicle. Steering of both the front and rear wheels may be effected while the grader is either standing or traveling, and likewise the leaning of the front and rear wheels may be adjusted while the vehicle is standing or traveling. In addition, the front and rear pairs of wheels may be individually leaned since there is no connection between them or their operating motors. Still further, the angularity of the main frame 10 with respect to the front and rear power traction units may be adjusted so that the rear wheels are either to the right or the left of the front wheels or track them, and this angularity may be adjusted from zero to a maximum on either side.

As illustrated, this angular adjustment takes place simultaneously on both the front and rear tractors and this is the preferred arrangement, though it is obvious that by providing two valves instead of the single valve 103, the angularity of each power traction unit 13 and 14 might be independently adjusted and in fact such independent adjustment might be employed even to steer the vehicle by swinging the power traction units 13 and 14 simultaneously in reverse directions. By employing such an arrangement, which is within the scope of my invention, the steering motors above described might be completely eliminated. I prefer, however, the arrangement of parts as illustrated in the drawings and as previously described in detail.

It is obvious also that the weight distribution has reached a high peak since the maximum weight of the unit will be in the power traction units 13 and 14 and will be concentrated over the associated traction wheels 15 and 16, respectively.

The symmetrical nature of the grader is obvious and contributing factors are the fact that one of the power traction units faces one way and the other faces the other way. That is, in each instance the radiators of the power traction units 13 and 14 are at the two extreme ends of the vehicle. Also the main frame 10 is generally symmetrical about a central transverse plane, and the post 67 is located centrally thereof with the seats 69 and 70 symmetrically and oppositely located with respect to said post 67.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A road grader including a main frame, power traction units at opposite ends of said main frame, each having its own engine, road grading mechanism mounted on said main frame, means for raising, lowering and laterally shifting said grading mechanism relative to said main frame, means attaching one of said power traction units to said main frame for pivotal movement about an upright axis while holding it against movement relative thereto on a horizontal axis, and means attaching the other of said power traction units to said main frame for pivotal movement about an upright axis and also for pivotal movement relative thereto on a horizontal axis.

2. A road grader including a main frame, power traction units at opposite ends of said main frame, each having its own engine, road grading mechanism mounted on said main frame, means for raising, lowering and laterally shifting said grading mechanism relative to said main frame, means attaching one of said power traction units to said main frame for pivotal movement on an upright axis while holding it against movement relative thereto on a horizontal axis, and means attaching the other of said power traction units to said main frame for pivotal movement about an upright axis and also for pivotal movement relative thereto on a horizontal axis.

3. A road grader including a main frame, power traction units at opposite ends of said main frame, each having its own engine, road grading mechanism mounted on said main frame, means for raising, lowering and tilting said grading mechanism relative to said main frame, means attaching one of said power traction units to said main frame for pivotal movement about an upright axis while holding it against movement relative thereto on a horizontal axis, and means attaching the other of said power traction units to said main frame for pivotal movement relative thereto on a horizontal axis.

4. A road grader including a main frame, power traction units at opposite ends of said main frame, each having its own engine, road grading mechanism mounted on said main frame, means for laterally shifting said grading mechanism relative to said main frame, means attaching one of said power traction units to said main frame while holding it against movement relative thereto on a longitudinal horizontal axis, and means attaching the other of said power traction units to said main frame for pivotal movement relative thereto on a longitudinal horizontal axis.

5. In a road grader, a main frame, grader mechanism on said main frame, a power traction unit at each end of said main frame, means adjustably connecting each power traction unit to said main frame for adjustment about an upright axis, means for adjustably leaning the wheels of each power traction unit on horizontal axes, and means for steering the wheels of each power traction unit.

6. In a road grader, a main frame, grader mechanism on said main frame, a power traction unit at each end of said main frame, means adjustably connecting each power traction unit to said main frame, means for adjustably leaning the wheels of each power traction unit on horizontal axes, and means for steering the wheels of each power traction unit.

7. In a road grader, a main frame, grader mechanism on said main frame, a power traction unit at each end of said main frame, each having its own engine, means adjustably connecting each power traction unit to said main frame for pivotal movement about an upright axis, and means for steering the wheels of each power traction unit relative to said unit.

8. A road grader including a pair of longitudinally spaced power traction units, each having its own engine and a pair of laterally spaced traction and steering wheels, an elongated frame, means adjustably connecting said power traction units to opposite ends of said frame for adjustment about spaced upright axes, grader mechanism carried by said frame between said power traction units, means for raising, lowering and laterally adjusting said grader mechanism, means for adjustably leaning the wheels of each power traction unit on horizontal axes, and means steering the wheels of each power traction unit by swinging them relative thereto on upright axes.

FRED J. WRIGHT.

REFERENCES CITED

The following references are of record in the file of this patent:

UNITED STATES PATENTS

| Number | Name | Date |
|---|---|---|
| 867,282 | McFarren | Oct. 1, 1907 |
| 922,044 | Rockwell | May 18, 1909 |
| 1,162,640 | Morton | Nov. 30, 1915 |
| 1,209,209 | Ross | Dec. 19, 1916 |
| 1,308,314 | Wilcox | July 1, 1919 |
| 1,447,073 | Gore | Feb. 27, 1923 |
| 1,457,692 | Carter | June 5, 1923 |
| 1,681,319 | Bartlett | Aug. 21, 1928 |
| 1,868,648 | Wells et al. | July 26, 1932 |
| 1,925,306 | Dean | Sept. 5, 1933 |
| 2,130,274 | Harrison et al. | Sept. 13, 1938 |
| 2,147,193 | Durr | Feb. 14, 1939 |
| 2,195,607 | Wilson et al. | Apr. 2, 1940 |
| 2,247,464 | Arndt | July 1, 1941 |
| 2,317,623 | Lee | Apr. 27, 1943 |
| 2,325,731 | Arentzen et al. | Aug. 3, 1943 |
| 2,347,882 | Choate et al. | May 2, 1944 |
| 2,362,262 | French | Nov. 7, 1944 |
| 2,362,636 | Joy | Nov. 14, 1944 |
| 2,368,202 | Clark | Jan. 30, 1945 |
| 2,374,196 | Harbers | Apr. 24, 1945 |

FOREIGN PATENTS

| Number | Country | Date |
|---|---|---|
| 24,547/35 | Australia | Sept. 21, 1935 |